Oct. 30, 1962   J. T. WARKOCZEWSKI   3,060,774
CORE SHEARING DEVICE
Filed Dec. 8, 1958

INVENTOR.
Joseph T. Warkoczewski
BY
ATTORNEY.

United States Patent Office 3,060,774
Patented Oct. 30, 1962

3,060,774
CORE SHEARING DEVICE
Joseph T. Warkoczewski, Kansas City, Mo., assignor to Gustin-Bacon Manufacturing Company, a corporation of Missouri
Filed Dec. 8, 1958, Ser. No. 778,896
6 Claims. (Cl. 83—98)

This invention relates to mold core shearing devices and refers more particularly to such a core shearing device adapted to precisely and accurately shear frangible mold cores for use in centrifugal casting molds adapted to produce finely perforated metal rings.

In my application Serial No. 721,491, filed March 14, 1958, entitled "Method and Apparatus for Forming Finely Perforated Rings," I have disclosed apparatus and method which produce finely perforated metal rings in a centrifugal mold employing frangible fine diameter core elements to produce the fine diameter perforations in the metal rings. As noted in the above application, the frangible cores, which are commonly a mixture of graphite and clay, must be cut to precise lengths for use in the mold. To obtain the basic mold core material in the proper diameter, for an economical cost, it is most often necessary to purchase these cores at odd lengths from the desired core lengths in the mold. Some mold size variance also occurs. Therefore, it is eminently desirable to have a core shearing device which will produce mold cores of the proper length, with a minimum of breakage, a maximum of accuracy, and at a high rate of speed.

Therefore, an object of my invention is to provide a mold core shearing device which accurately shears mold cores of a frangible material and of a fine diameter at a high rate of speed and economically.

Another object of my invention is to provide a mold core shearing device which is relatively cheap to manufacture, accurate and speedy in operation, has a long life under heavy use and is self-cleaning, whereby to permit relatively continuous operation.

Another object of my invention is to provide a mold core shearing device which is adjustable to shear cores of different lengths.

Another object of my invention is to provide a mold core shearing device which will successively cut more than a single desired mold core length from an over-length mold core blank, without requiring reloading of the core shearing device.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figure 1:
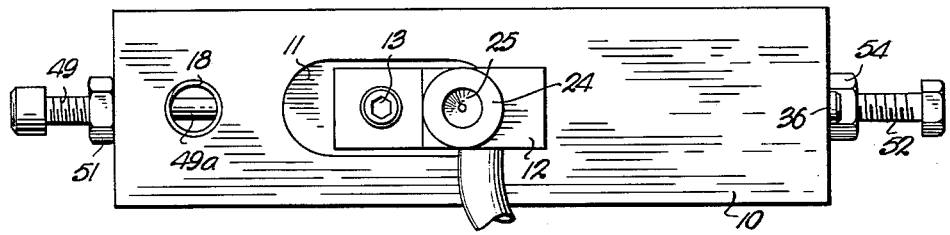
FIG. 1 is a top view of the inventive core shearing device.
Figure 2:
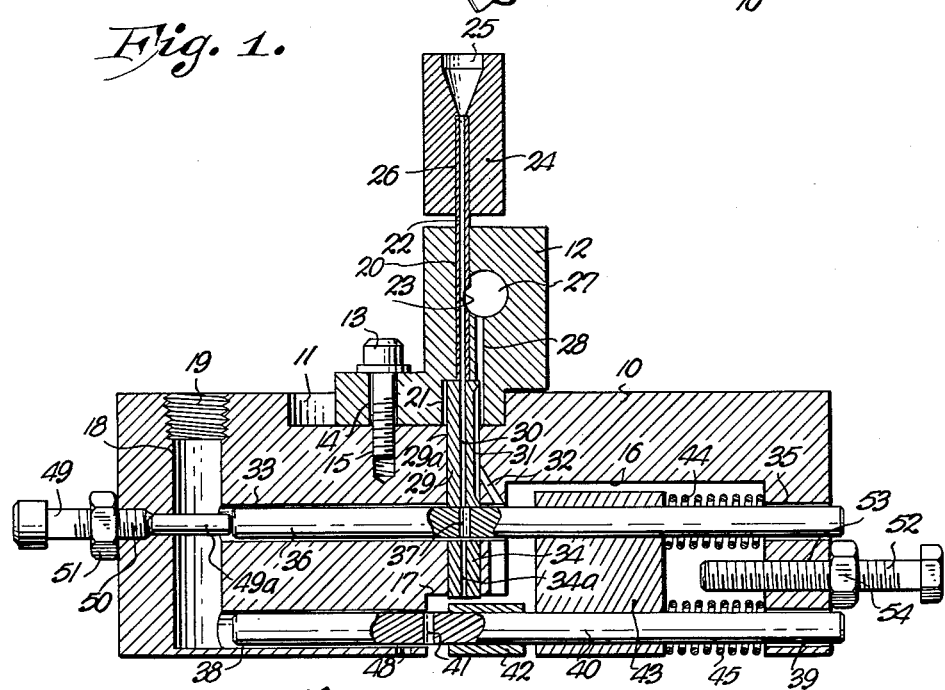
FIG. 2 is a side-sectional view of the inventive core shearing device of FIG. 1.

Referring to the drawings, at 10 is shown a core receiving block which operates to house the core shearing apparatus. A recess 11 in the upper side thereof receives upper pressure block 12 therein. Block 12 is fixed to the core receiving block 10 by bolt 13 which extends into openings 14 and 15 in blocks 12 and 10, respectively. A second large recess 16 rectangular in vertical cross section is formed in the under side of block 10 and has a shelf 17 at one side thereof. An air passage 18 having threaded portion 19 at its upper end extends into the block, but not therethrough. Block 12 has a first opening 20 extending from the top surface thereof downwardly thereinto adjacent the lower edge where it runs into a cavity 21. Funnel tube 22 fits within said opening 20 and has an opening 23 in the side thereof. A funnel block 24 having a funnel mouth 25 in the upper end thereof and an opening 26 therethrough receives the upper end of funnel tube 22. Air inlet 27 is formed in block 12 and communicates with opening 23 in tube 22. Waste blowout passage 28 extends downwardly from inlet 27 into cavity 21.

Figure 3:
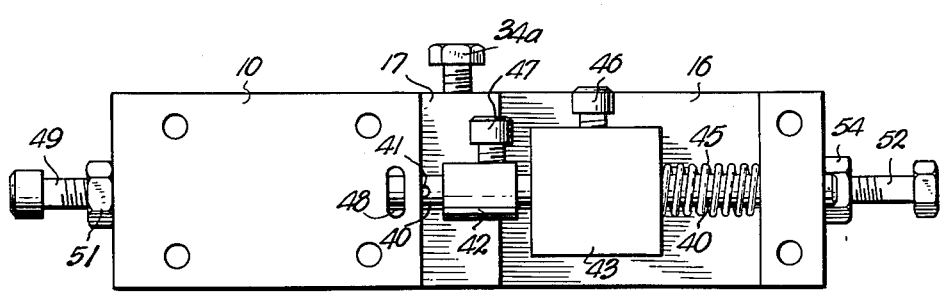
FIG. 3 is a bottom view of the inventive core shearing device of the previous two figures.

Upper shearing edge insert 29 in opening 29a has passage 30 therein to match and continue tube 22. Insert 29 also has groove 31 connecting passage 28 in block 12 through passage 32 to cutter bar passage 33. Cutter bar passage 33 extends from air passage 18 into recess 16 intersecting at right angles the opening 29a which extends through block 10 to receive the upper and lower shear inserts 29 and 34. A pair of bolts (one shown at 34a in FIG. 3) hold shear inserts 29 and 34 in block 10. Matching opening 35 in the portion of block 10 bounding recess 16 is axially in line with and at least substantially the same inner diameter as passage 33. Cutter bar 36 having opening 37 extending at right angles to the axis thereof, slidably fits in passages 33 and 35 and is of a length preferably at least substantially equal to the distance from the end of passage 33 entering passage 18 to the outer edge of passage 35. Passage 37 continues passage 30 of insert 29 and 34a of insert 34 when aligned therewith.

Core exit control bar passages 38 and 39 are formed in the portions of block 10 which receive passages 33 and 35 and are vertically in line with and parallel to the latter passages in the block 10. Passages 38 and 39 are axially in line, one with the other. Core exit control bar 40 having passage 41 therein normal to the axis thereof fits within passages 38 and 39 and is reciprocable therein. The fit is a sliding one. Passage 38 communicates at one end with passage 18 and at the other end with the space created by shelf 17. Shear length adjustment collar 42 is slidably fixed to bar 40 by set screw 47.

Means for interlocking the bars 36 and 40 together for unitary, precisely controlled movement of one relative another is provided by block 43 slidably fixed to each bar 36 and 40. Coil springs 44 and 45 on bars 36 and 40, respectively, abut block 43 and the inner wall of recess 16 in block 10. Set screws 46 (FIG. 3) permit longitudinal adjustment of block 43 on bars 36 and 40. Set screw 47 on collar 42 permits longitudinal adjustment of collar 42 on bar 40. Blow-by release slot 48 is provided in the underside of block 10 communicating with passage 38. Vertical opening alignment bolt 49 threads into opening 50 in block 10 extending into passageway 18. Nut 51 on bolt 49 regulates the extension of elongate portion 49a of bolt 49 into the block 10. Stop bolt 52 threads into opening 53 in block 10 whereby to abut against block 43 in recess 16 and limit its travel to the right in FIG. 1. Nut 54 permits locked adjustment of bolt 52 and regulation of its extension into recess 16.

In operation, with springs 44 and 45 acting against block 43 to tend to move bars 36 and 38 to the left in FIG. 1 so that bar 36 abuts extension 49a of bolt 49 and with regulatory adjustments such that opening 37 is in line with passages 30 and 34a and collar 42 is under passage 34a, a mold core of an outer diameter less than the inner diameter of passages 30 and 34a is fed into the funnel opening 25, through tube 22 and to a position with its lower end resting on the upper surface of collar 42. The distance from the top of collar 42 to the lower edge of opening 37 is the desired length of the mold core segment to be cut. It is anticipated that the mold core will be of sufficient length to extend at least into opening 37 or, if a double core shearing operation is to be carried out on the single core, it will extend upwardly a proportional distance above the top edge of opening 37 in bar 36. The edges of opening 37 and the edges of the passages 30 and 34a next thereto are squared off evenly whereby to properly shear the mold core.

When the mold core is in position, compressed air is fed into inlet 27 from any conventional connection to the upper pressure block 12 from whence the air enters opening 23, where it acts upon the upper end of the mold core, tending to force it downwardly against the collar 42. No air passes through passage 28, groove 31 or passage 32 as bar 36 blocks passage 32 at its lower end. With the air pressure through inlet 27 turned on, compressed air through passage 18 acts upon the ends of bars 36 and 38 to move them from left to right in FIG. 1 at a high velocity. The mold core is sheared across its length and the portion in opening 37 is carried to a position opposite the lower end of passage 32. Bar 38 is moved to where opening 41 registers with passage 34a, thus permitting the proper length sheared mold core to fall through the opening 41. Once opening 37 registers with passage 32, air passage 28, groove 31 and passage 32 feed air from passage 27 through opening 37 and blow out the sheared core portion and any debris in the opening 37. No air goes through passage 30 at this time as bar 36 blocks it. With springs 44 and 45 resisting the drive of bars 36 and 38 to the right in FIG. 1, release of air pressure in passage 18 permits return of the bars to the position of FIG. 1. At this time, any portion of the mold core remaining in the passage 30 falls through the opening 37, passage 34a and abuts the top of sleeve 42. Once again, air passage 32 is shut off and air flows through passage 30 takes place. If any air goes past the mold core segment therein, it aids in cleaning out the passageway. Another reciprocation of the bars 36 and 38 will shear another desired length section or permit the too short residue length to fall out through opening 41. A reciprocation without any core portion of any length whatsoever in either passage 30 or passageway 34a will serve to blow-out the entire series of passages and recesses in the block 10 to clear it for another mold core blank to be sheared to length, if desired.

The specific use of blow-by slot 48 is to provide an exit path for any air leaking by the core exit control bar 40. Without this slot 48, air leakage from the opening of passage 38 into the area 17 might cause a core to hang in passage 41 of core exit control bar 40. Thus, when the bar 40 would return to rest position, the core in passage 41 would be crushed against the outer edge of passage 38.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the appended claims.

Inasmuch as many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A core shearing device comprising a core receiving block having a core feeding passage extending therethrough, a cutter bar mounted in a cutter bar passage in said block and reciprocable therein, said cutter bar passage intersecting said core feeding passage intermediate the ends of the latter at a substantial angle thereto, a core exit control bar mounted in a core exit control bar passage in said block and reciprocable therein, the core exit control bar mounted across the exit of the core feeding passage, a first core passage in said cutter bar intermediate its ends with its axis substantially parallel to the core feed passageway when aligned therewith, a second core passage in said core exit control bar intermediate its ends with its axis substantially parallel to the core feeding passageway when aligned therewith, means for normally retaining said cutter bar with its first core passage in alignment with said core feed passage, means for normally retaining said core exit control bar with its second core passage out of alignment with said core feeding passage, and means for simultaneously moving said two bars to translate them in said block relative to said core feeding passageway to a position where the cutter bar core passage is out of register with the core feeding passage and the control bar core passage is in register therewith whereby to shear any core in said core feeding passage and permit it to fall out of said block.

2. Apparatus as in claim 1 wherein said means for simultaneously moving said bars includes means for locking said bars together in translational motion.

3. A device as in claim 1 including means for permitting adjustment of the shear length of the core, said means comprising a removable collar on the core exit control bar.

4. Apparatus as in claim 1 wherein the means for simultaneously moving said two bars includes means for locking said bars together in translational motion, said latter means comprising a rigid block connecting the two bars position in a hollow portion of the core receiving block and adapted to move in translational motion therewith, the means for normally retaining said bars comprising resilient springs mounted on said bars and abutting the inside of the core receiving block with one end thereof and the bar connecting block with the other.

5. A core shearing device comprising a core receiving block having a core feeding passage extending therethrough, a cutter bar mounted in a cutter bar passage in said block and reciprocable therein, said cutter bar passage intersecting the core feeding passage intermediate the ends of the latter at a substantial angle thereto, a core exit control bar mounted in a core exit control bar passage in said block and reciprocable therein, the core exit control bar mounted across the exit of the core feeding passage, a first core passage in said cutter bar intermediate its ends with its axis substantially parallel to the core feed passageway when aligned therewith, a second core passage in said core exit control bar intermediate its ends with its axis substantially parallel to the core feeding passageway when aligned therewith, means for normally retaining said cutter bar with its first core passage in alignment with said core feed passage, means for normally retaining said core exit control bar with its core passage out of alignment with said core feeding passage, means for simultaneously moving said two bars to translate them in said block relative to said core feeding passageway to a position where the cutter bar core passage is out of register with the core feeding passage and the control bar core passage is in register therewith whereby to shear any core in said core feeding passage and permit it to fall out of said block, a source of compressed air, and an air passage connected to the said source and to the core feed passageway at a level about the height of an unsheared core standing therein supported on said exit control bar, whereby to hold the core down by said compressed air against the exit control bar in said cutting operation.

6. A core shearing device comprising a core receiving block having a core feeding passage extending therethrough, a cutter bar mounted in a cutter bar passage in said block and reciprocable therein, said cutter bar passage intersecting said core feeding passage intermediate the ends of the latter at a substantial angle thereto, a core exit control bar mounted in a core exit control bar passage in said block and reciprocable therein, the core exit control bar mounted across the exit of the core feeding passage, a first core passage in said cutter bar intermediate its ends with its axis substantially parallel to the core feed passageway when aligned therewith, a second core passage in said core exit control bar intermediate its ends with its axis substantially parallel to the core feeding passageway when aligned therewith, means for normally retaining said cutter bar with its first core passage in alignment with said core feed passage, means for normally retaining said core exit control bar with its second core passage out of alignment with said core feeding passage, means for simultaneously moving said two bars to translate them in said block relative to said core feeding passageway to a position where the cutter bar core passage is out of register with the core feeding passage and the control bar core passage is in register therewith whereby to shear any core in said core feeding passage and permit it to fall out of said block, a source of compressed air, and an air passage in the block connecting to the said source and to the zone around the block connecting to the said source and to the zone around the juncture of the core feed passage with the cutter bar passage, said air passage so aligned as to register with the cutter bar core passage when the exit bar core passage is in registry with the core feeding passageway.

References Cited in the file of this patent
UNITED STATES PATENTS

| | | |
|---|---|---|
| 2,436,122 | Rotsler | Feb. 17, 1948 |
| 2,855,627 | Prentiss | Oct. 14, 1958 |